US008625515B2

(12) United States Patent
Liu et al.

(10) Patent No.: US 8,625,515 B2
(45) Date of Patent: Jan. 7, 2014

(54) METHOD AND APPARATUS FOR DYNAMIC CHANNEL ASSIGNMENT AND STREAM CONTROL IN MULTI-HOP WIRELESS NETWORKS

(75) Inventors: Hang Liu, Yardley, PA (US); Lin Luo, Piscataway, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 137 days.

(21) Appl. No.: 13/147,409

(22) PCT Filed: Feb. 3, 2009

(86) PCT No.: PCT/US2009/000671
§ 371 (c)(1),
(2), (4) Date: Aug. 2, 2011

(87) PCT Pub. No.: WO2010/090617
PCT Pub. Date: Aug. 12, 2010

(65) Prior Publication Data
US 2011/0286418 A1 Nov. 24, 2011

(51) Int. Cl.
*H04W 4/00* (2009.01)
*H04W 72/00* (2009.01)
(52) U.S. Cl.
USPC .......................... 370/329; 370/401; 455/452.1
(58) Field of Classification Search
USPC ........................................................ 370/329
See application file for complete search history.

(56) References Cited

U.S. PATENT DOCUMENTS

| 2006/0114851 A1* | 6/2006 | Gupta et al. ................... 370/329 |
| 2006/0215605 A1* | 9/2006 | Srikrishna et al. ............. 370/329 |
| 2007/0087756 A1* | 4/2007 | Hoffberg ....................... 455/450 |
| 2007/0147248 A1* | 6/2007 | Kodialam et al. ............. 370/235 |
| 2008/0080545 A1* | 4/2008 | Wong et al. .................... 370/437 |
| 2008/0107069 A1* | 5/2008 | Wu et al. ........................ 370/329 |
| 2008/0151821 A1* | 6/2008 | Cho et al. ....................... 370/329 |

FOREIGN PATENT DOCUMENTS

WO WO02093782 11/2002

OTHER PUBLICATIONS

Royer et al., "A Review of Current Routing Protocols for Ad Hoc Mobile Wireless Networks", IEEE Personal Communications, IEEE Communications Society, US, vol. 6, No. 2, Apr. 1, 1999, pp. 46-55.
International Search Report for PCT/US2009/000671 dated Sep. 10, 2009.

* cited by examiner

*Primary Examiner* — Gregory Sefcheck
*Assistant Examiner* — Joshua Smith
(74) *Attorney, Agent, or Firm* — Robert D. Shedd; Jerome G. Schaefer

(57) ABSTRACT

A method and apparatus are described for determining a route, channel assignment, multiple-in, multiple out stream control and a transmission schedule in a network, including determining the route responsive to long term network conditions and long term traffic conditions of the network, determining the channel assignment, the multiple-in multiple-out stream control, and the transmission schedule responsive to local channel conditions, local link conditions and local traffic conditions of the network and determining if there has been a change in one of the long tem network conditions and the long term traffic conditions of the network.

8 Claims, 11 Drawing Sheets

Channel 1        Fig. 5(a)        Channel 2

Channel 1        Channel 2

METHOD AND APPARATUS FOR DYNAMIC CHANNEL ASSIGNMENT AND STREAM CONTROL IN MULTI-HOP WIRELESS NETWORKS

This application claims the benefit, under 35 U.S.C. §365 of International Application PCT/US09/000671, filed Feb. 3, 2009, which was published in accordance with PCT Article 21(2) on Aug. 12, 2010 in English.

FIELD OF THE INVENTION

The present invention relates in general to wireless networks and, in particular, to dynamic channel assignment and multiple-in multiple-out steam control in multi-hop wireless networks.

BACKGROUND OF THE INVENTION

In multi-hop wireless networks, a node can be equipped with multiple radios, each radio with multiple-input and multiple-output (MIMO) antenna technology. MIMO is the use of multiple antennas and advanced signal processing techniques at the physical layer of both the transmitter and receiver to improve communication performance. It offers significant increases in data throughput via spatial multiplexing or spatial reuse, without consuming additional bandwidth. In spatial multiplexing, MIMO can allow transmitting multiple independent data streams simultaneously over the MIMO antenna elements, each stream is transmitted from a different transmit antenna element in the same frequency channel. If these signals arrive at the receiver antenna array with different spatial signatures, the receiver can separate these streams. MIMO link can also suppress interference from neighboring links. Multiple streams can be transmitted simultaneously with interference suppressed in the same vicinity using the same frequency channel as long as the total number of streams (data streams and interference streams) is not greater than the number of receiving antennas. Furthermore each node equips multiple radios and can simultaneously operate on multiple channels. Of course, the total number of available channels is limited. The performance of a multi-hop wireless network depends on the channels that radio nodes operate and the MIMO streams that a radio transmits. The operating channel of a radio and the number of streams that a radio can transmit are inter-dependent.

In one prior art scheme, channel assignment has been studied in multi-radio multi-hop wireless mesh networks. However, the previous work has not considered the effect of MIMO or spatial multiplexing or spatial reuse on channel assignment. In another prior art scheme, the capacity gain of stream control in single-channel MIMO wireless mesh networks has been investigated. However, a single channel was used and the channel assignment was not considered. Channel assignment and MIMO stream control are inter-dependent and also depend on the traffic demand, data routing and transmission scheduling in multi-radio, multi-channel, multi-hop, MIMO wireless networks (M4 wireless networks). They should be determined jointly with data routing and transmission scheduling to obtain the optimal performance.

To obtain full benefits of multi-radios and MIMO technique, the channel assignment and the number and mode of MIMO stream transmissions for a radio should be determined jointly. In addition, data routing and transmission scheduling should also be considered while determining how to assign the operating channel of the radios (called channel assignment) and select MIMO streams and modes to transmit/receive for radios (called stream control) in multi-radio, multi-channel, multi-hop wireless networks with MIMO links. In the past, channel assignment and stream control has not been jointly determined nor has data routing and transmission scheduling been taken into consideration when performing channel assignment and stream control, in particular for multi-radio, multi-channel, multi-hop wireless networks with MIMO links.

SUMMARY OF THE INVENTION

The present invention is directed to a method and apparatus to jointly assign the operating channels/frequency spectrum of one or more radios in a node and the streams of the multiple-input and multiple-output (MIMO) radio in multi-hop wireless networks. The present invention describes the methods of joint channel assignment, MIMO stream control, data routing and transmission scheduling for bandwidth access and sharing along time, frequency, and space domains in multi-hop wireless networks with MIMO links in order to maximize the network throughput subject to some fairness constraints.

The present invention is directed to a method and apparatus for joint channel assignment, stream control, routing and scheduling in M4 wireless networks. In addition, the present invention describes the method in which routing is established to select the optimal path in terms of longer-time average traffic demands and channel quality for system stability, while scheduling, channel assignment and stream control are jointly determined for opportunistic bandwidth access and sharing in time, frequency and space dimensions based on instantaneous local channel condition variations and traffic dynamics.

A method and apparatus are described for determining a route, channel assignment, multiple-in, multiple out stream control and a transmission schedule in a network, including determining the route responsive to long term network conditions and long term traffic conditions of the network, determining the channel assignment, the multiple-in multiple-out stream control, and the transmission schedule responsive to local channel conditions, local link conditions and local traffic conditions of the network and determining if there has been a change in one of the long term network conditions and the long term traffic conditions of the network.

BRIEF DESCRIPTION OF THE DRAWINGS

The present invention is best understood from the following detailed description when read in conjunction with the accompanying drawings. The drawings include the following figures briefly described below:

FIGS. 5(a), 5(b), 5(c) and 5(d) illustrate an example for the joint scheduling, channel assignment and stream control method in a multi-hop wireless network with six nodes in accordance with an exemplary embodiment of the present invention.

DETAILED DESCRIPTION OF THE PREFERRED EMBODIMENTS

As used herein, "/" denotes alternative names for the same or similar components or structures. That is, a "/" can be taken as meaning "or" as used herein.

Figure 1:
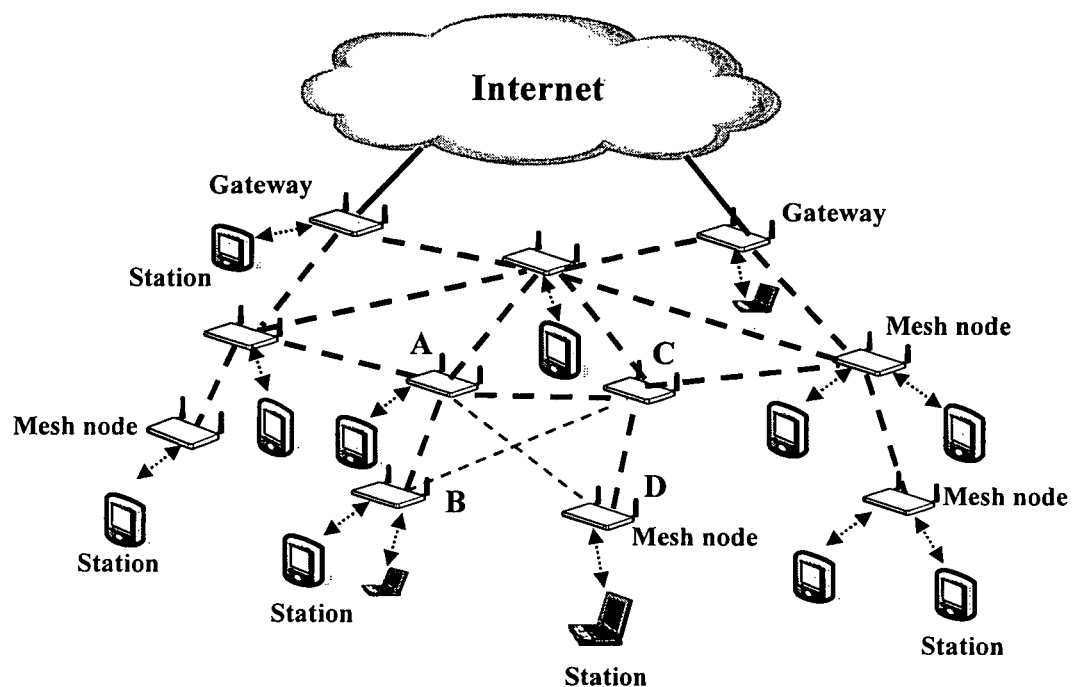
FIG. 1 illustrates a multi-radio, multi-channel, multi-hop, MIMO (M4) wireless mesh network (WMN).

FIG. 1 shows a multi-radio, multi-channel, multi-hop, MIMO (M4) wireless mesh network (WMN). Each mesh node/mesh access point (MAP)/mesh router is equipped with one or more radios. Each radio has multiple MIMO antenna elements and can form MIMO links with neighboring radios if the radios operate on the same channel. Mesh nodes can aggregate traffic for wireless clients/stations (STAs) such as laptops and smart phones, in its coverage area. Mesh nodes are interconnected via wireless links to form a multi-hop wireless backbone infrastructure for relaying the traffic for each other. The mesh nodes participate in routing and data forwarding. Some of the wireless mesh nodes are equipped with gateway functionality to enable connectivity to the wired Internet and called gateway nodes. In such networks traffic is mainly routed by the WMN wireless backbone between the non-gateway nodes and the wired Internet through the gateways.

The WMN backbone network is modeled as a directed graph G=(V,E) where V represents the set of nodes in the network and E the set of directed links. If node u can transmit directly to node v, then this direct transmission is represented by a link, u->v, with the link belonging to the set E. The set of gateway nodes is denoted by $V_G \subset V$ and hence $V_M = V \backslash V_G$ ($V_M$ belongs to V, and $V_M$ and $\overline{V_G}$ are mutually exclusive) represents the set of the non-gateway nodes. The aggregate user traffic load on node u is denoted by l(u). The load l(u) may be due to outgoing or incoming traffic. However, for ease of explanation, herein, it can be assumed that l(u) represents only outgoing traffic. The method and results easily apply (by flow reversal) to the more general case of both outgoing and incoming traffic.

It can be assumed that there are C orthogonal channels available in the network numbered from 1 to C, for example, with IEEE 802.11b networks C=3 in the 2.4 GHz industrial, scientific and medical (ISM) band, and with 802.11a C=12 in the 5 GHz Unlicensed National Information Infrastructure (U-NII) band.

A node $u \in V$ has N(u) radios and F(u) denotes the set of channels assigned to node u and |F(u)| is the number of channels in F(u), i.e. the number of channels assigned to node u (obviously, $|F(u)| \le N(u)$). In single-antenna systems, one of the practical constraints on radio assignment is that it is not useful to have two radios tuned to the same channel at a given node, since local interference at the node will ensure that only one of them is active at any time. However, this constraint is relaxed in MIMO systems as explained below. A communication between two nodes u and v is possible only when there is a common channel among the sets F(u) and F(v).

By exploiting multi-paths in indoor or outdoor environments, MIMO is able to provide very high data rate by simultaneously transmitting multiple independent data streams on the same wireless channel. This kind of simultaneous transmissions, referred to as spatial multiplexing, is very desirable to WMNs where network capacity is the main concern. Assume the transmitter u and the receiver v of a MIMO link e=(u, v) are equipped with $K_u$ and $K_v$ antenna elements, respectively, there can be no more than $K_e = \min\{K_u, K_v\}$ concurrent MIMO streams over link e. Furthermore MIMO can suppress interference from transmission between the neighboring nodes. The receiver can isolate and decode all incoming streams successfully as long as the total number of streams (including the data streams and the interference streams) is less than or equal to its number of antenna elements, i.e. the degree of freedom (DOF).

Figure 2:
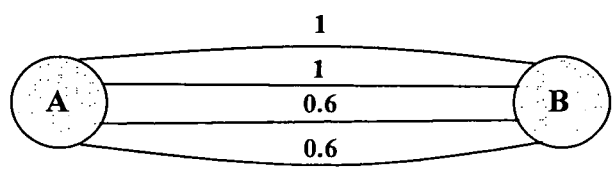
FIG. 2 illustrates the MIMO streams and their channel gains for link (A, B) and link (C, D).
Figure 2:
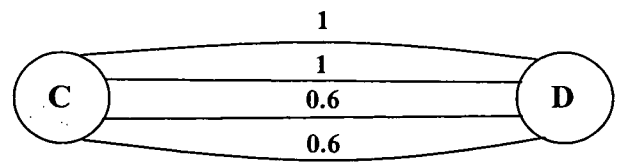

On a MIMO link the channel gains for the streams can have quite large disparities. As an example, consider the four nodes in FIG. 1, labeled as A, B, C and D. Assume that each node has a single radio with K=4 antennas. Also consider two MIMO links (A, B) and (C, D), as shown in FIG. 2. The normalized gains of the four streams of the two links are 1, 1, 0.6 and 0.6. The two links are close to each other and thus are subject to mutual interference, so the total number of independent streams transmitted cannot be greater than four.

A transmission mode (mode) represents the MIMO streams, the modulation and the channel coding used by a radio to transmit signals. If the two links transmit in a TDMA manner, then the total normalized throughput is 3.2. That is, if link (A,B) transmits four MIMO streams in a time slot and link (C,D) transmits four MIMO streams in the next time slot and link (A,B) then transmits four MIMO streams again in the next time slot, then the normalized throughput is 3.2. However, if the best two channel streams/modes are selected for transmission from each link, (that is, link (A, B) and link (C, D) each transmit two streams with maximum channel gains simultaneously) then the total normalized throughput is 4. How to select channel streams and modes for transmission is called stream control.

$R_T$ denotes the transmission range. For direct communications, two nodes need to be within transmission range of each other, and need to have a common channel assigned to their radios. c(e, i, j) denotes the average link capacity or data rate for link/edge e=(u, v) when it works on channel i and transmits j independent streams. The number of interfering streams at the receiver is not greater than K−j, where K is the number of antenna elements of the radio.

$R_I$ denotes the interference range. Assume that $R_I$ is equal to $q \times R_T$ where $q \ge 1$. A pair of links that use the same channel and are within interference range may interfere with each other's communications. $I(e) \in E$ denotes the set of edges that interfere with an edge $e \in E$. It should be noted that simultaneous link transmissions on two edges $e_1$ and $e_2$ that interfere with each other is possible, as long as these transmissions are on distinct channels or if the transmissions are on the same channel but the receivers have sufficient degrees of freedom to suppress interference.

An optimal framework to maximize the capacity of the network while considering the fairness constraints is described first. A goal is to maximize a proportional parameter/factor $\lambda$ where at least $\lambda l(u)$ traffic throughput can be routed from each node $u \in V$ to the wired Internet via the gateways. As defined above, $l(u)$ represents the traffic load on node u. This problem is implicitly coupled with routing, channel assignment, scheduling and stream control problems. Hence, the present invention seeks 1) a channel assignment specifying the channels assigned to the radios on each node $u \in V$, denoted by $F(u)$; 2) a network flow $f(e,i,j)$, for each link $e=(u, v) \in E$, on each channel i belonging to $F(e)$ and for each number of streams j over e and 3) a schedule that determines/establishes/specifies the set of simultaneous communications on each of available channels $i=1, 2, \ldots, C$ and MIMO streams at each time slot t, for $t=1, 2, \ldots, T$ where T is the period of the schedule. Here $f(e,i,j)$ or $f(u,v,i,j)$ denotes the average rate at which traffic is transmitted from node u to node v on channel i when using j streams. The network flow must satisfy flow conservation at all nodes when $\lambda l(u)$ flow is sourced (transmitted) from every node $u \in V$. A schedule is feasible if in every time slot the number of radios assigned for transmitting and receiving at a node u does not exceed the number of radios on node u, $N(u)$, and the number of antennas dedicated at every radio for communication or for canceling out interference does not exceed the number of the radio's antenna elements. A schedule can achieve a particular flow $f(e, i, j)$ if the average rate for the communication $(e, i, j)$ over the T slots is $f(e, i, j)$.

Let $\delta(u)$ denote all the edges in E that are incident (incoming or outgoing) to node $u \in V$. Among these the incoming edges are denoted by $\delta^-(u)$ and the outgoing links are denoted by $\delta^+(u)$. Also, $I_{\delta^-}(u)$ denotes the set of links that interfere with links directed to node u. Thus, $I_{\delta^-}(u) = \cup_{e=(v,u) \in E} I(e)$. It should be noted that this set of links can be considered as causing interference to transmission received at node u. The set $\delta^-(u)$ is included in the set $I_{\delta^-}(u)$. Likewise, $I_{\delta^+}(u)$ denotes the set of links that get interference from links directed out of node u. Thus $I_{\delta^+}(u) = \cup_{e=(u,v) \in E} I(e)$. It should be noted that the set of links can be thought of as getting interference from transmissions initiated by node u. The set $\delta^+(u)$ is included in the set $I_{\delta^+}(u)$. For an edge $e=(u, v) \in E$, let $X_{(e,i,j)}(t)$ be 1 if there is a communication $(e,i,j)$ from u to v on channel i and using j streams at time slot t, and let $X_{(e,i,j)}(t)$ be 0 otherwise. Thus, the average flow rate $f(e,i,j)$ for this communication over T time slots is given by $$f(e, i, j) = \frac{1}{T} \sum_{t \in \{1,2,\ldots T\}} X_{(e,i,j)} c(e, i, j).$$

Rearranging the terms yields $$\frac{1}{T} \sum_{t \in \{1,2,\ldots T\}} X_{(e,i,j)} = \frac{f(e, i, j)}{c(e,i,j)} \quad (1)$$

Then the following cross-layer optimization problem is formulated.

$$\max \lambda \quad (2)$$

$$\forall u \in V_M, \sum_{e \in \delta^-(u),i,j} f(e, i, j) = \sum_{e \in \delta^+(u),i,j} f(e, i, j) + \lambda l(u) \quad (3)$$

$$\forall (e, i, j), f(e, i, j) \leq c(e, i, j) \quad (4)$$

-continued $$\forall u \in V, \sum_{i=1}^{c} \sum_{e \in \delta(u)} \sum_{j=1}^{K} \frac{f(e, i, j)}{c(e, i, j)} \leq N(u) \quad (5)$$

$$\forall i, u \in V, \sum_{e \in I_{\delta^-}(u)} \sum_{j=1}^{K} \frac{f(e, i, j)}{c(e, i, j)} j \leq KC_q \quad (6)$$

$$\forall i, u \in V, \sum_{e \in I_{\delta^+}(u)} \sum_{j=1}^{K} \frac{f(e, i, j)}{c(e, i, j)} j \leq KC_q \quad (7)$$

The present invention seeks to maximize $\lambda$ where at least $\lambda l(u)$ throughput can be routed from each non-gateway node u to the Internet through one or more gateways. Equation (3) is the flow conservation constraint. At any non-gateway node u, the total outgoing flow must equal the total incoming flow plus node u's own aggregate traffic. Equation (4) ensures that no capacities are violated. Equation (5) is the radio constraint. Since a radio can only be engaged in one communication (either send or receive) at a time, a node u can participate in at most $N(u)$ communications (send or receive) at the same time. Thus, $\sum_{e \in \delta(u),i,j} X_{(e,i,j)}(t) \leq N(u)$. Averaging over all time slots:

$$\frac{1}{T} \sum_{t \in \{1,2,\ldots T\}} \sum_{e \in \delta(u),i,j} X_{(e,i,j)}(t) \leq N(u).$$

Thus, from Equation (1) the radio constraint (Equation (5)) is derived.

The last two constraints (Equations (6) and (7)) are the interference constraints. Node u must dedicate enough degrees of freedom for interference suppressions from all simultaneous interfering communications on the same channel. In addition, other nodes must dedicate enough antennas for interference suppression from the transmission on node u if the other nodes work on the same channel as node u. This is modeled as the following set of necessary conditions that must be satisfied by any feasible solution. For any node u working on channel i and for any time slot t, $\sum_{e \in I_{\delta^-}(u)} \sum_{j=1}^{K} X_{(e,i,j)}(t) j \leq KC_q$ and $\sum_{e \in I_{\delta^+}(u)} \sum_{j=1}^{K} X_{(e,i,j)}(t) j \leq KC_q$, where $C_q$ is a constant that depends only on q. For example, $C_q=4,8,12$ for $q=1,2,2.5$ respectively. Average the above equations over all time slots to derive equations (6) and (7).

It is clear that any optimal solution must satisfy the above constraints and hence solving this linear programming problem (LP) provides an upper bound on the fraction of demand/load $\lambda$, that is, $\lambda l(u)$ traffic that the network can route from node u to Internet via one or more gateways. The solution itself, however, may not be feasible in terms of channel assignment and schedulability. Besides, the formulation only gives a long-term optimum average. The formulation accounts for the average traffic demands $l(u)$ and the long-term average link capacities $c(e,i,j)$. However, the actual channel conditions on a wireless link may change over a much shorter time-scale/time period, for example, a time period for a few packet transmissions. In general, it is desirable that the network layer selects the route based on the network global view and longer-term expected characteristics to achieve system stability. Link layer and physical layer mechanisms accounts for local instantaneous channel variations and traffic dynamics to benefit from opportunistic transmissions.

Next, a method is described that is based on such time-scale separation in which the path is established for a longer-term use, while scheduling, channel assignment and stream control are dynamically adapted to the short-term channel conditions and traffic dynamics.

Referring to an exemplary embodiment of the present invention, the flow solution, obtained by solving the joint routing, channel assignment, MIMO stream control, scheduling equations to maximize the network throughput and maintain the fairness, can be used as the input to determine the long-term routing. And then scheduling, channel assignment and stream control can be performed for opportunistic bandwidth access and sharing along time, frequency, and space domains to adapt to the shorter-term channel condition variations and traffic dynamics.

Figure 3:
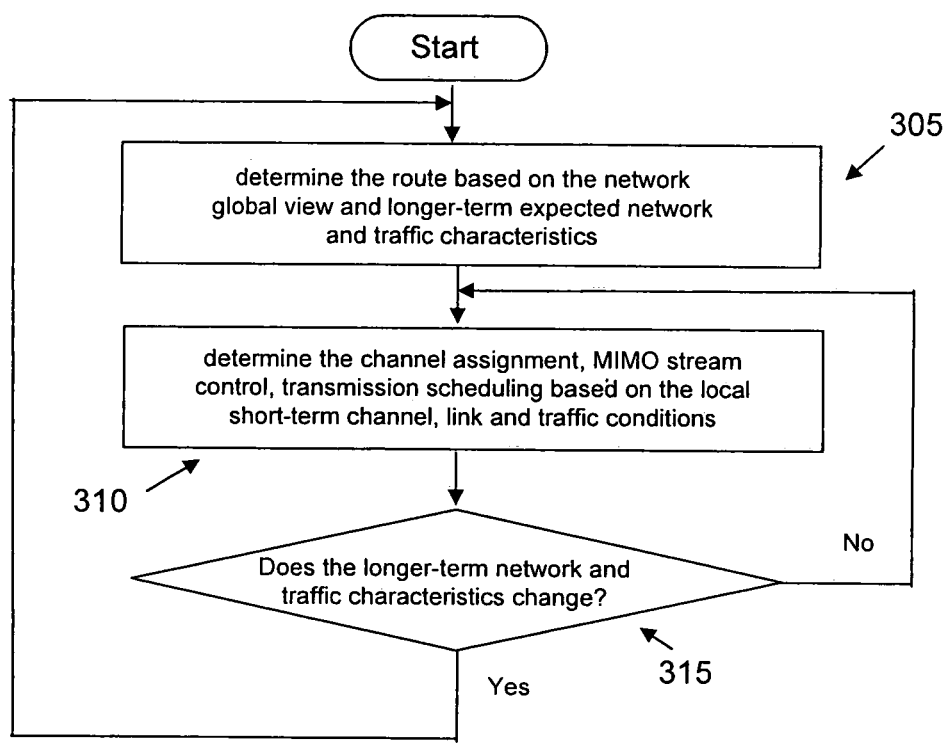
FIG. 3 is a flowchart for the routing, scheduling, channel assignment and stream control procedure in accordance with an exemplary embodiment of the present invention.

FIG. 3 is a flowchart for the routing, scheduling, channel assignment and stream control procedure in accordance with an exemplary embodiment of the present invention. At 305 long term routing is determined based on the network global view and long term expected network and traffic characteristics. That is, long term routing is determined based on joint routing, channel assignment, MIMO stream control and scheduling (to maximize network throughput and fairness). At 310 channel assignment, MIMO stream control and transmission scheduling are determined based on the local short term channel, link and traffic conditions. At 315 a test is performed to determine if the longer term network and traffic conditions have changed. If the longer term network and traffic conditions have changed then processing continues at 305. If the longer term network and traffic conditions have not changed then processing continues at 310.

The optimal $\lambda$ value (as computed by solving the above equations (2)-(7)) is denoted as $\lambda^*$ and the optimal flow solution as $f^*(e,i,j)$. Then a flow control is performed at the source node u of each flow and routing is determined based on the flow solution. Each node u injects traffic at an average rate no larger than $\lambda^* l(u)$ to avoid overwhelming the network. Routing is determined as follows. For each link $e=(u,v)$ that consists of a pair of radios, one radio on node u and the other radio on node v, the link's carried traffic is calculated as $$f(u, v) = \sum_{i=1}^{C} \sum_{j=1}^{K} f(u, v, i, j).$$

The interest here is the volume of traffic on a link (between two radios) for routing purposes regardless of which channel a node works on/communicates over and regardless of how many MIMO streams are used.

In an exemplary embodiment of the present invention, a greedy maximal scheduling algorithm is used on multi-channel and MIMO networks to jointly perform scheduling, channel assignment and stream control.

In single-channel, single-radio single-antenna networks, the maximum system capacity can be achieved by the following throughput-optimal scheduling algorithm: at each time slot t, the schedule $M(t)$ should be chosen to maximize the queue-weighted rate-sum $\Sigma_{e:E \in M(t)} q_e(t) r_e$, where $q_e(t)$ and $r_e$ are the current queue size and the transmission rate at link e, respectively.

It should be noted that a node may have multiple radios. It is possible to have multiple links between two nodes in the transmission range, which share the same queue. A link is formed by a pair of radios, one on each node. $r_e$ is the link capacity or transmission rate on link e between a pair of radios on node u and node v. $q_e$ represents the size of queue at node u wherein data will be sent to node v. The data in the queue may be sent in multiple parallel links between node u and node v. The Greedy Maximal Scheduling (GMS) algorithm can be viewed as an approximation to throughput-optimal algorithms. Roughly speaking, a schedule $M(t)$ is maximal if $M(t)$ is a non-interfering schedule, and no more links can be added to $M(t)$ without violating the interference constraint. The Greedy Maximal Scheduling is used with multi-channel and MIMO networks, and it is called mmGMS herein. The mmGMS method of the present invention computes a maximal schedule by starting from the link-channel-stream triplet with the largest queue weighted rate $q_e(t) r_e^{(i,j)}$, where $r_e^{(i,j)}$ is the transmission rate/capacity of link e on channel i using the j-th stream. Specifically, the mmGMS method of the present invention proceeds as follows.

1. Starting from an empty schedule $M^i(t)$ for a time slot t on channel i, form a set S of all link-channel-stream triplets (e,i,j) and determine the weight of the link-channel-stream triplet (e,i,j) to be $q_e r_e^{(i,j)}$.
2. Search for the link-channel-stream triplet (e,i,j) with the largest weight $q_e r_e^{(i,j)}$. Add (e,i,j) to $M^i(t)$, meaning that in the t-th slot link e can transmit on channel i using the j-th stream. Remove from S the triplet (e,i,j) and update the queue size $q_e = q_e - r_e^{(i,j)\delta}$, where $\delta$ is the time slot length. Assign channel i to link e that belongs to nodes u and v where e=(u,v), i.e., assign an unused radio on node u to operate on channel i $F(u)=F(u)\cup\{i\}$ if it has not been done and assign an unused radio on the node v to operate on channel i if it has not been done $F(v)=F(v)\cup\{i\}$.
3. Remove from S all the triplets (e',i,j'), where $e' \in I(e)$ and j' is the stream on e' with the lowest channel gain. Since e and e' interfere with each other so it is assumed here that one degree of freedom on e' corresponding to the lowest-channel-gain stream is dedicated to suppress interference from the transmission (e,i,j).
4. If $|F(u)| \geq N(u)$ (node u has used up all its radios, i.e no radio interfaces are available on node u anymore), remove from S all the triplets (e',i',j') where e' is any link incident on node u ($e' \in \delta(u)$), i' is any channel not in F(u) ($i' \notin F(u)$), and j'=1, 2, ..., K.
5. Do the same for the receiving node v. If $|F(v)| \geq N(v)$ (node v has used up all its radios, i.e no radio interfaces are available on node v anymore), remove from S all the triplets (e'',i'',j'') where e'' is any link incident on node v ($e'' \in \delta(v)$), channel i'' is any channel not in F(v) ($i'' \notin F(v)$), and j''=1, 2, ..., K.
6. Repeat the above steps from step 2 until S is empty.

Figure 4:
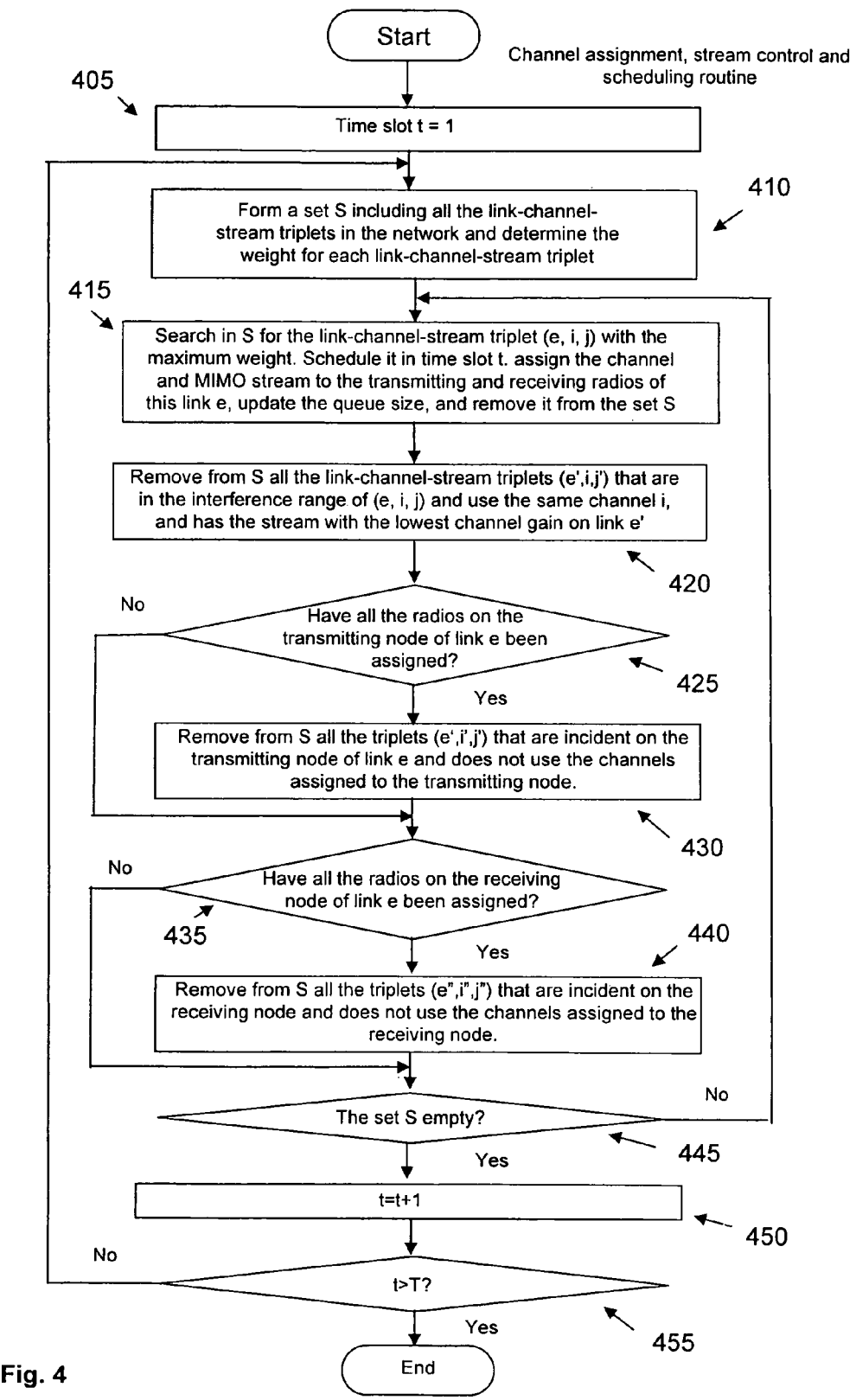
FIG. 4 is a flowchart for the joint scheduling, channel assignment and stream control method in accordance with an exemplary embodiment of the present invention.
Figure 5B:
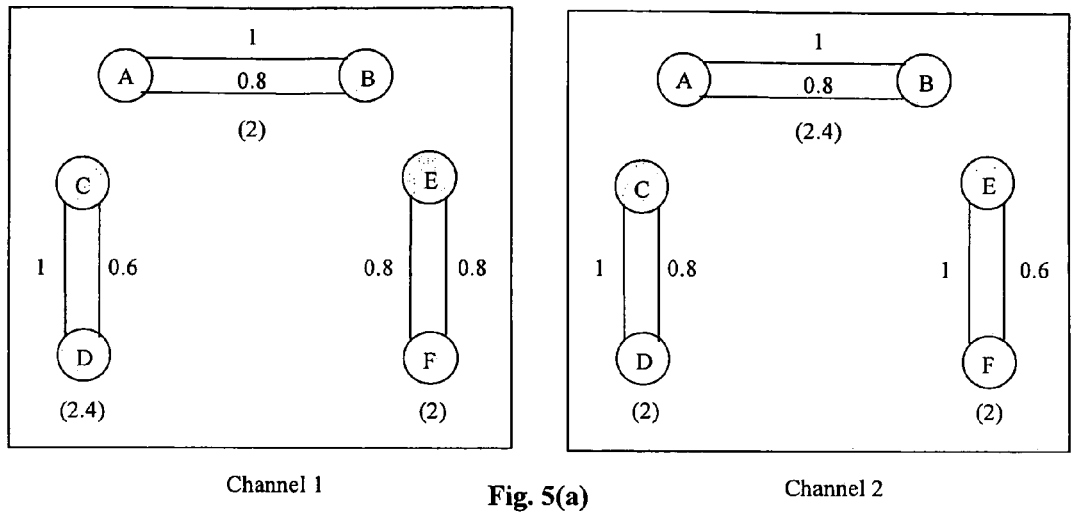
Figure 5B:
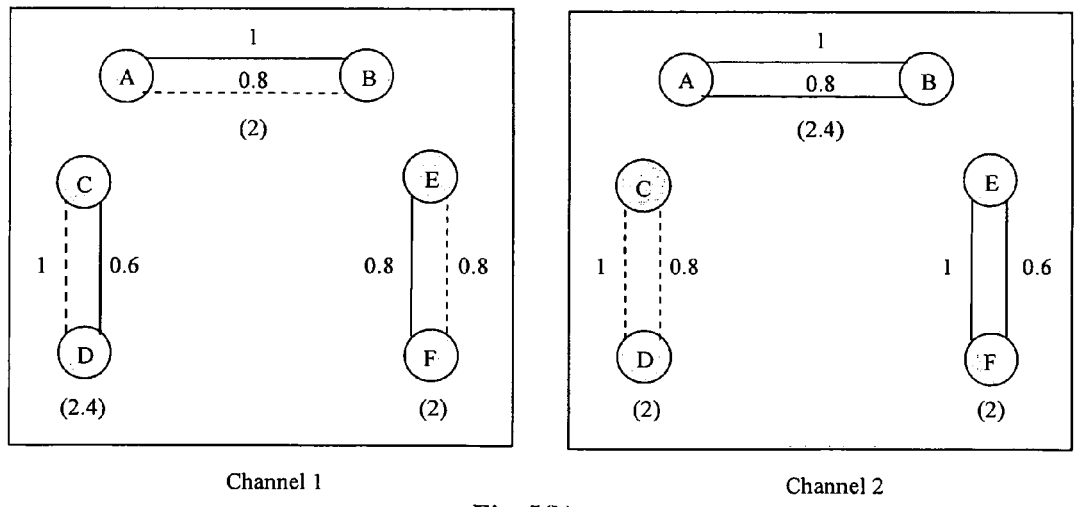
Figure 5C:
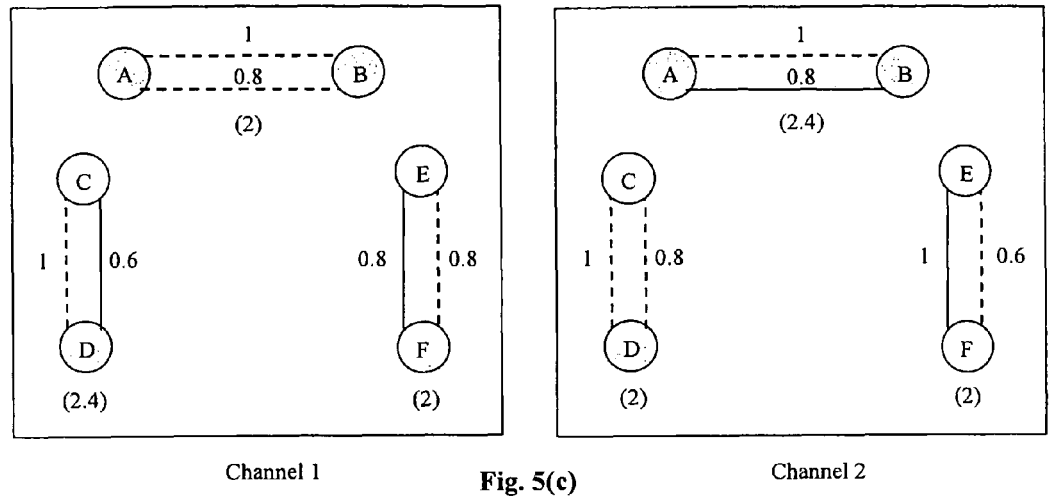
Figure 5D:
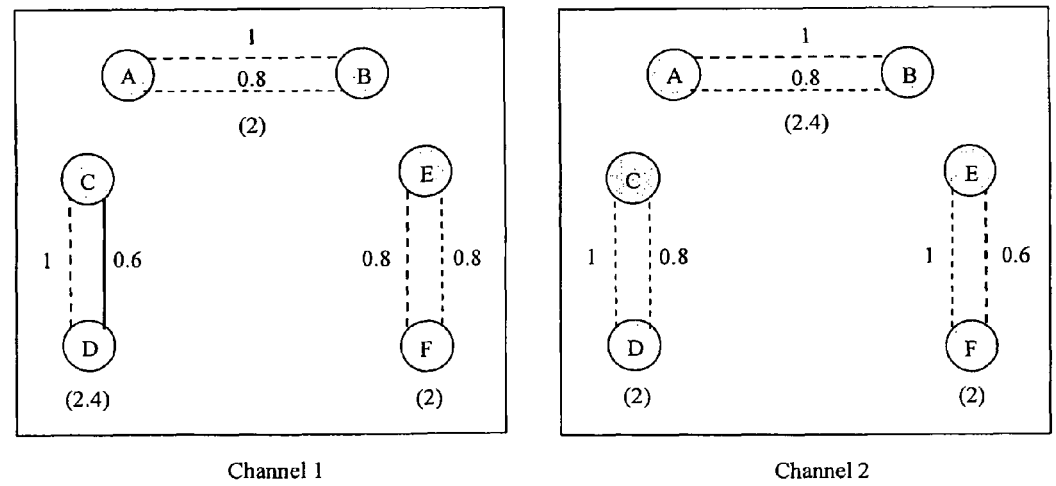

FIG. 4 is a flowchart for the joint scheduling, channel assignment and stream control method in accordance with an exemplary embodiment of the present invention. At 405, the time slot counter/pointer t is initialized. At 410 starting from an empty schedule $M^i(t)$ for each channel i, form a set S of all link-channel-stream triplets (e,i,j) in the network and determine the weight of the link-channel-stream triplet (e,i,j) to be $q_e r_e^{(i,j)}$. At 415 search for the link-channel-stream triplet (e,i,j) with the largest/maximum weight $q_e r_e^{(i,j)}$. Schedule the link-channel-stream triplet in time slot t and assign the channel and MIMO stream to the transmitting and receiving radios of link e and update the queue size and remove the link-channel-stream triplet from the set S. That is, (e,i,j) is added to $M^i(t)$, meaning that in the t-th slot link e can transmit on channel i using the j-th stream. The queue size $q_e = q_e - r_e^{(i,j)\delta}$ is updated, where $\delta$ is the time slot length. Assign channel i to link e that belongs to nodes u and v where e=(u,v), i.e., assign an unused radio on node u to operate on channel i $F(u)=F(u)\cup\{i\}$ if it has not been done and assign an unused radio on the node v to operate on channel i if it has not been done $F(v)=F(v)\cup\{i\}$. At 420 remove from S all the triplets (e',i,j'), that are in the interference range of (e,i,j) where e'∈I(e) and j' is the stream on e' with the lowest channel gain. Since e and e' interfere with each other, it is assumed here that one degree of freedom on e' corresponding to the lowest-channel-gain stream is dedicated to suppress interference from the transmission (e,i,j).

At 425 a test is performed to determine if all radios on the transmitting node of link e have been assigned. If all radios on the transmitting node of link e have been assigned (if |F(u)|≥N(u) that is, if node u has used up all its radios, i.e no radio interfaces are available on node u anymore) then at 430, remove from S all the triplets (e',i',j') where e' is any link incident on the transmitting node and does not use the channels assigned to the transmitting node. That is, remove from S all the triplets (e',i',j') where e' is any link incident on node u (e'∈δ(u)), i' is any channel not in F(u) (i'∉F(u)), and j'=1, 2, . . . , K. If all radios on the transmitting node of link e have not been assigned then processing proceeds to 435. At 435 a test is performed to determine if all the radios on the receiving node of link e have been assigned. If all radios on the receiving node of link e have been assigned (if |F(v)|≥N(v) that is if node v has used up all its radios, i.e no radio interfaces are available on node v anymore) then at 440, remove from S all the triplets (e'',i'',j'') where e'' is any link incident on node v (e''∈δ(v)), channel i'' is any channel not in F(v) (i''∉F(v)), and j''=1, 2, . . . , K. If all the radios on the receiving node of link e have not been assigned then processing proceeds to 445. At 445 a test is performed to determine if set S is empty. If set S is not empty then processing proceeds to 415. If set S is empty then the time slot counter/pointer is incremented at 450. A test is performed at 455 to determine if the time slot counter/pointer has exceeded the maximum value of time slots available that it can be (t>7). If the time slot counter/pointer has not exceeded the maximum value of time slots available then processing proceeds to 410. If the time slot counter/pointer has exceeded the maximum value of time slots available then processing ends.

As an example, consider a multi-hop wireless network with six nodes as shown in FIGS. 5(*a*), 5(*b*), 5(*c*) and 5(*d*). Each of the six nodes A to F is equipped with a single radio and each radio has 2 MIMO antenna elements. Three MIMO links exist between A and B, C and D, E and F, respectively. Each of the links has two streams, shown as the two lines between the two nodes. The three links are close to each other, so there is mutual interference if the links work on the same channel. Assume there are two non-overlapping channels available in the network, named channel 1 (CH1) and channel 2 (CH2) respectively, and also assume each link has three units of data in its queue.

At the beginning of time slot t, the channel conditions on channel 1 and channel 2 are illustrated on FIG. 5(*a*). The numbers beside the lines are the channel gains for the respective streams, while those in the parentheses denote the aggregate rates of the corresponding links. The aggregate rate of a link is the transmission rate on that link when the link uses all streams to transmit. For example, link C-D can transmit at 2.4 data-units per time-slot if it transmits two independent streams at a time. The scheduling, channel assignment, and stream control method in the present invention proceeds as follows.

Form a set S of twelve link-channel-stream triplets, denoted by the twelve lines in the FIG. 5(*a*). It should be noted that for a given link on a given channel, the streams are sorted in the descending order of channel gains. For example, (C-D,1,1) refers to the stream of link C-D on channel 1 with stream 1. Its link gain is 1.

Add (C-D, 1, 1) to $M^1(t)$ as it has the largest weight $$q_{C-D} r_{C-D}^{(1,1)} = 3 \times \left( \frac{1}{1+0.6} \times 2.4 \right) = 4.5$$

among all the link-channel-stream triplets. Update the queue size at link C-D to $$q_{C-D} = 3 - \left( \frac{1}{1+0.6} \times 2.4 \right) = 1.5.$$

Remove (C-D, 1, 1) from set S. In addition, one degree of freedom at links A-B and E-F must be dedicated to suppress interference from (C-D, 1, 1) on channel 1, so the triplets (A-B,1,2) and (E-F,1,2) are removed from set S. The triplets (C-D,2,1) and (C-D,2,2) are also removed from set S because channel 1 has been assigned to nodes C and D (they have only one radio). The set S after this step is shown in FIG. 5(*b*), where the removed triplets are denoted by dashed lines.

In set S (among the triplets denoted by solid lines), (A-B, 2,1) has the largest weight $$q_{A-B} r_{A-B}^{(2,1)} = 3 \times \left( \frac{1}{1+0.8} \times 2.4 \right) = 4.$$

Add (*A-B*, 2, 1) to $M^2(t)$ and update the queue size at link A-B to $$q_{A-B} = 3 - \left( \frac{1}{1+0.8} \times 2.4 \right) = 1.67.$$

Remove from S the triplets (A-B,2,1), (E-F,2,2) and (A-B,1, 1). The updated set S is shown in FIG. 5(*c*).

In the set S, (E-F,2,1) has the largest weight $$q_{E-F} r_{E-F}^{(2,1)} = 3 \times \left( \frac{1}{1+0.6} \times 2 \right) = 3.75.$$

Add (E-F,2,1) to $M^2(t)$ and update the queue size at link E-F to $$q_{E-F} = 3 - \left( \frac{1}{1+0.6} \times 2 \right) = 1.75.$$

Remove from S the triplets (E-F,2,1), (A-B,2,1) and (E-F,1,2). The resulting set S is shown in FIG. 5(*d*).

Up to this point, there is only (C-D,1,2) left in the set S. Add it to $M^1(t)$ and update the queue size at C-D to $$q_{C-D} = 1.5 - \left( \frac{0.6}{1+0.6} \times 2.4 \right) = 0.6$$

from set S.

At the end, the schedule includes (C-D, 1, 1), (C-D, 1, 2), (A-B, 2, 1) (E-F, 2, 1). That is, link C-D is active on channel 1 with 2 streams, simultaneously links A-B and E-F are scheduled on channel 2 with 1 stream each, respectively.

In an alternative embodiment the channel assignment, MIMO stream control, and transmission scheduling procedure in the present invention is performed in two stages. The first stage is channel assignment for a time slot t. Channel assignment is performed, assuming no stream control. That is, in this stage, if a link with a pair of radios (one for transmitting and the other for receiving) is selected and assigned a channel, all of the radio's degrees of freedom (MIMO antenna elements) are dedicated to transmitting and receiving simultaneous spatial multiplexing streams on this link. With spatial multiplexing, multiple streams are transmitted simultaneously and each stream is transmitted from a different transmit antenna in the same frequency channel. If these signals arrive at the receiver antenna array with sufficiently different spatial signatures, the receiver can separate these streams. The maximum number of spatial streams is limited by the lesser of the number of antennas at the transmitter or receiver. The second stage is stream control for the time slot t. In the first stage, some of links cannot obtain an idle channel, and cannot be scheduled to be active for transmission because of the limited number of available channels and the interference constraint (another link in the interference range has been scheduled). However, an unassigned link can share a channel with the neighboring links in the spatial domain using MIMO antenna technique as long as the total number of communication streams being transmitted by radios located within the interference range is less than the effective degrees of freedom (the number of receiving MIMO antenna elements) of the receiving radios. In the second stage, it is determined whether or how a link unassigned in the first stage can share with an active link (i.e. a link assigned a channel in the first stage) on the channel of the active link. This procedure is referred to as the MIMO link pairing. After pairing, the two links can be active simultaneously on the same channel under the constraint that the total number of streams is not greater than the degrees of freedom.

In an exemplary embodiment for the channel assignment of the above first stage of the present invention, the following procedure is performed to assign the channel in a time slot, t.

1. Starting from an empty schedule $M^i(t)$ for each channel i and assuming no MIMO stream control, form a set S of all link-channel pairs (e,i). Let $r_e^i$ denote link e's capacity on channel i using all the K streams for spatial multiplexing, where K is the degree of freedom of the link, i.e. the lesser in the number of antenna elements at the transmitting or receiving radios. Determine the weight of the link-channel pair (e,i) to be $q_e r_e^i$. Search for the link-channel pair (e,i) with the largest/maximum weight $q_e r_e^i$. Add (e,i) to $M^i(t)$, meaning that in the t-th slot link e can transmit on channel i. Assign channel i to link e that belongs to nodes u and v where e=(u,v), i.e., assign an unused radio on node u to operate on channel i if it has not been done $F(u)=F(u)\cup\{i\}$ and assign an unused radio on node v to operate on channel i if it has not been done $F(v)=F(v)\cup\{i\}$.
2. Remove from set S the link-channel pair (e,i) and update the queue size $q_e=q_e-r_e^{i\delta}$, where $\delta$ is the time slot length.
3. Remove from set S all the link-channel pair (e',i), where e'e∈I(e).
4. If $|F(u)|\geq N(u)$ (node u has used up all its radios, no radio interfaces are available on node u anymore.), remove from set S all the link-channel pairs (e',i') where e' is any link incident on node u (e'∈δ(u)), and channel i'∈1, 2, . . . C.
5. If $|F(v)|\geq N(v)$ (node v has used up all its radios, no radio interfaces are available on node v anymore), remove from set S all the link-channel pairs (e'',i'') where e'' is any link incident on node v, (e''∈δ(v)), and channel i''∈1, 2, . . . C.
6. Repeat the above steps from step 2 until set S is empty.

Figure 6:
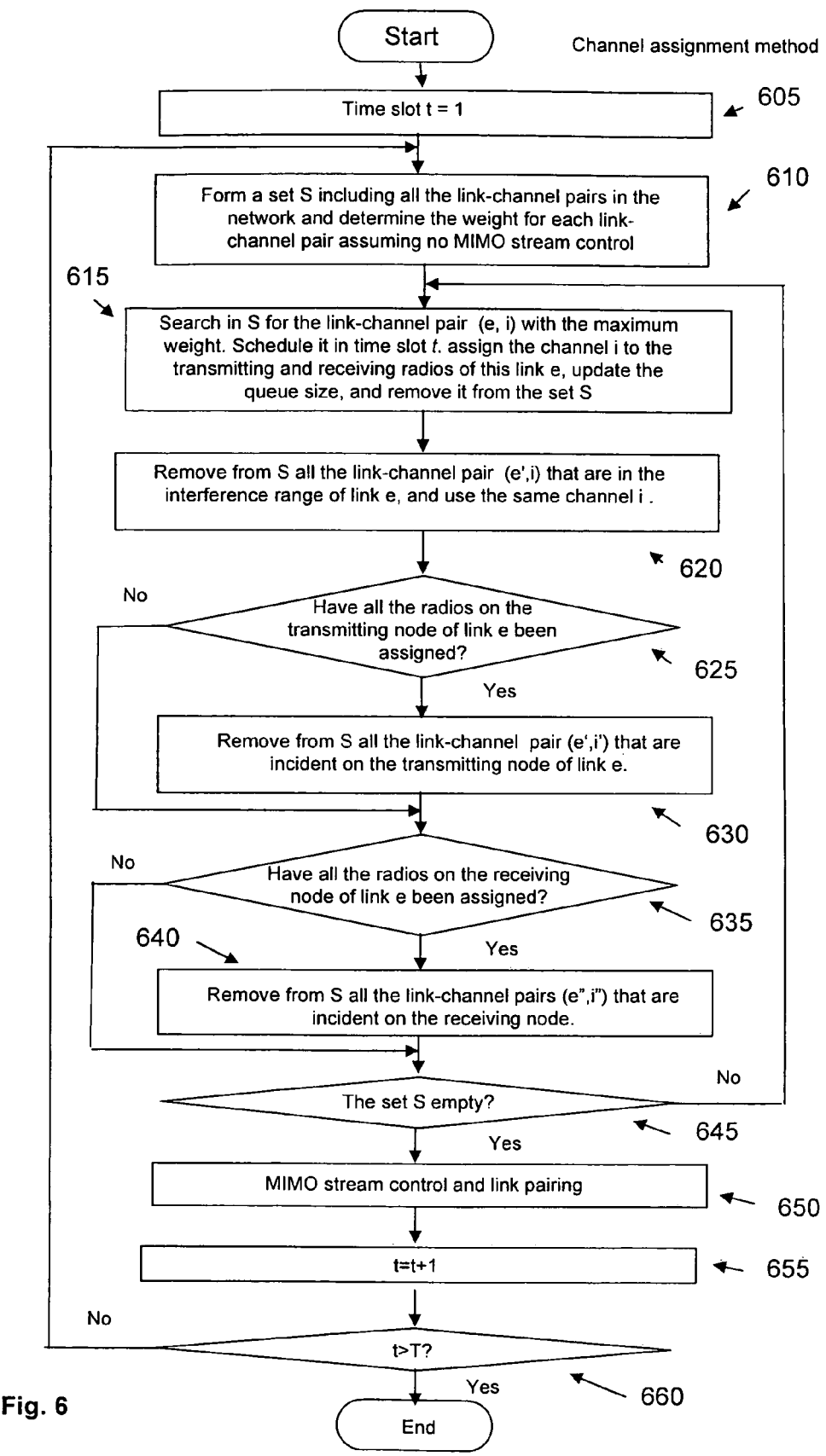
FIG. 6 is a flowchart for the channel assignment procedure (first stage) in the two-stage channel assignment and stream control method in accordance to an exemplary embodiment of the present invention.

FIG. 6 is a flowchart for the channel assignment procedure (first stage) in the two-stage channel assignment and stream control method in accordance to an exemplary embodiment of the present invention. At 605 the time slot counter/pointer is initialized. At 610 starting from an empty schedule $M^i(t)$ for each channel i and assuming no MIMO stream control, form a set S of all link-channel pairs (e,i). Let $r_e^i$ denote link e's capacity on channel i using all the K streams for spatial multiplexing, where K is the degree of freedom of the link, i.e. the lesser in the number of antenna elements at the transmitting or receiving radios. Determine the weight of each link-channel pair (e,i) to be $q_e r_e^i$. At 615 search for the link-channel pair (e, i) with the largest/maximum weight $q_e r_e^i$. Add (e, i) to $M^i(t)$, meaning that in the t-th slot link e can transmit on channel i (add it to the schedule for the current time slot). Assign channel i to link e that belongs to nodes u and v where e=(u,v), i.e., assign an unused radio on node u to operate on channel i if it has not been done $F(u)=F(u)\cup\{i\}$ and assign an unused radio on node v to operate on channel i if it has not been done $F(v)=F(v)\cup\{i\}$. Remove from set S the link-channel pair (e,i) and update the queue size $q_e=q_e-r_e^{i\delta}$, where $\delta$ is the time slot length. At 620, remove from set S all the link-channel pair (e',i), where e'∈I(e). That is, remove all the link-channel pairs that are in the interference range of link e and use the same channel i.

A test is performed at 625 to determine if all the radios on the transmitting node of link e have been assigned. At 630, if $|F(u)|\geq N(u)$ (node u has used up all its radios, no radio interfaces are available on node u anymore—if all the radios on the transmitting node of link e have been assigned), remove from set S all the link-channel pairs (e',i') where e' is any link incident on node u (e'∈δ(u)), and channel i'∈1, 2, . . . C. If all the radios on the transmitting node of link e have not been assigned, then processing proceeds to 635. A test is performed at 635 to determine if all radios on the receiving node have been assigned. At 640 if $|F(v)|\geq N(v)$ (node v has used up all its radios, no radio interfaces are available on node v anymore—if all radios on the receiving node of link e have been assigned), remove from set S all the link-channel pairs (e'',i'') where e'' is any link incident on node v, (e''∈δ(v)), and channel i''∈1, 2, . . . C. A test is performed at 645 to determine if the set S is empty. If all radios on the receiving node on link e have not been assigned then processing proceeds to 645. If set S is empty then perform MIMO stream control and link pairing (see FIG. 7 and description below) at 650. If set S is not empty the processing proceeds to 615. At 655 increment the time slot counter/pointer. A test is performed at 660 to determine if the time slot counter/pointer has exceeded the maximum value of time slots available that it can be (t>T). If the time slot counter/pointer has not exceeded the maximum value of time slots available then processing proceeds to 410. If the time slot counter/pointer has exceeded the maximum value of time slots available then processing ends.

After the first stage (channel assignment), some links are assigned a channel and will be active in the slot t. Other links cannot be assigned a channel because the number of available channels is limited and there is an interference constraint. An unassigned link represents a link between two nodes each of which has at least one unassigned/unused radio. If there are still radios that are not assigned to a working channel at the first stage, two of the available radios in the transmission range may form a link and simultaneously operate on the same channel as a neighboring link to take advantage of MIMO for better throughput and fairness, i.e. pairing a link with another link.

An exemplary embodiment for stream control (second stage) in accordance with the present invention is now described. The links not having a channel assigned in the above described first stage can be assigned a channel and paired with a neighbor MIMO link using the follow procedure:

1. For any two nodes u, v in the transmission range with unassigned radios, where $|F(u)|<N(u)$ and $|F(v)|<N(v)$ (the transmitting radio not assigned and the receiving radio not assigned), construct $\min\{N(u)-|F(u)|, N(v)-|F(v)|\}$ parallel edges corresponding to the unassigned links between nodes u and v. All the unassigned links form a set U.
2. Search for the unassigned links with the highest queue size, i.e. the highest workload remaining after the first stage channel assignment, assuming that it is $L \in (u,v)$. It should be noted that the remaining queue size is the aggregated remaining queue size in node u corresponding to all the links between nodes u and v $L \in (u, v)$. These links share a queue.
3. For the unassigned link L with the maximum remaining queue size, try to find the pairing link candidate L' operating on channel i. A pairing link candidate L' must satisfy (a) L' is the only link that has been assigned on channel i among the neighboring links of link L in the first stage (the neighboring links of link L are the links in the interference range of link L). Let N(L, i) denote the set of links that have been assigned on channel i and interfere with link L on channel i. That is, the set of neighboring links of link L that have been assigned on channel i. $|N(L, i)|$ is the number of links in N(L,i). Then $|N(L,i)|=1$ and $L' \in N(L,i)$. And (b) no neighboring links of link L' has been assigned on channel i, i.e. paired with link L' in the second stage, i.e. $N(L',i)=\Phi$.
4. Determine the throughput of links L and L' (the data rate that can transmit on L and L') in this time slot as well as the MIMO streams and mode used by links L and L' for transmission if L is assigned on channel i and transmit simultaneously with link L' with MIMO, i.e. if L and L' pair. An exemplary embodiment for step 4 procedure is described below and depicted in FIG. 8.
5. There may be multiple pairing candidates for an unassigned link L. Repeat steps 3 and 4 for all the pairing candidates.
6. Select a candidate to pair among the candidate links such that link L can have the maximum throughput if pairing with this candidate. Assuming the candidate link L' is selected and L' operates on channel i, assign channel i on link L where $L \in (u,v)$. That is, assign an unused radio on node u to operate on channel i ($F(u)=F(u) \cup \{i\}$) and an unused radio on node v to operate on channel i ($F(v)=F(v) \cup \{i\}$.
7. Add (L,i) to $M^t(t)$, meaning that in the t-th time slot link L can be active on channel i using the MIMO streams and mode determined in step 4. Update $M^t(t)$ for link (L', i) with the new MIMO streams and mode determined in step 4. Links L and L' operate based on the MIMO streams and mode determined in step 4. After pairing, link L' may not transmit using all its MIMO streams as determined in the first stage because it will share the same channel with link L. The total number of MIMO parallel streams on link L and L' should not be greater than the degree of freedom, or the number of the antenna elements, K.
8. Update the queue size of link L and L'. $q_L = q_L - \theta_L^{i\delta}$ and $q_{L'} = q_{L'} + r_L^{i\delta} - \theta_{L'}^{i\delta}$ where $\theta_L^i$ and $\theta_{L'}^i$ are the throughput on link L and L' in time slot t, respectively, (determined in step 4.) $\delta$ is the time slot length. Due to the channel sharing of MIMO links L and L', data cannot transmit at the full link capacity of link L or link L', i.e. either link cannot transmit at its full degree of freedom, i.e. transmitting different streams on each of its antenna element. The actual transmission rate on links L and L' are $\theta_L^i$ and $\theta_{L'}^i$, respectively, not $r_L^i$ and $r_{L'}^i$. Recall in the first stage, the queue of link L' was updated with $r_L^i$ transmission rate. It needs to be modified in this step. Remove link L from the unassigned link set U.
9. If $|F(u)| \geq N(u)$ (node u has used up all its radios, no radio interfaces are available on node u anymore.), remove from U all the links e where e is any link incident on node u ($e \in \delta(u)$).
10. If $|F(v)| \geq N(v)$ (node v has used up all its radios, no radio interfaces are available on node v anymore), remove from the set U all the link-channel pairs e' where e' is any link incident on node v ($e' \in \delta(v)$).
11. It is possible that link L cannot find a link to pair. If so, the link L is inactive in this time slot, and remove link L from the unassigned link set U.
12. Repeat step 2 until the set U becomes empty.

Figure 7:
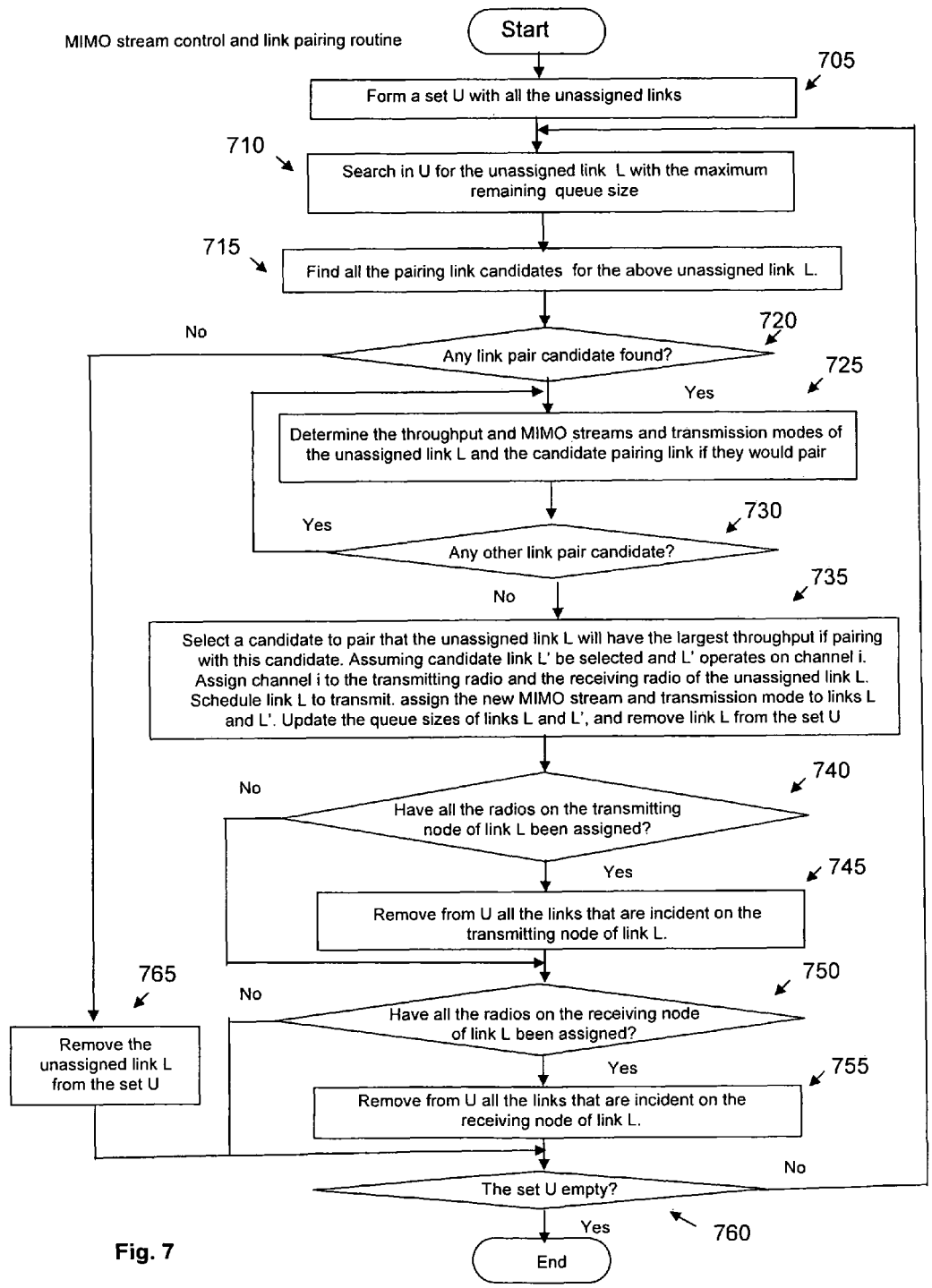
FIG. 7 is a flowchart for the stream control procedure (second stage) in the two-stage channel assignment and stream control method in accordance to an exemplary embodiment of the present invention.

FIG. 7 is a flowchart for the stream control procedure (second stage) in the two-stage channel assignment and stream control method in accordance to an exemplary embodiment of the present invention. For any two nodes u, v in the transmission range with unassigned radios, where $|F(u)|<N(u)$ and $|F(v)|<N(v)$ (the transmitting radio is not assigned and the receiving radio is not assigned), construct $\min\{N(u)-|F(u)|, N(v)-|F(v)|\}$ parallel edges corresponding to the unassigned links between nodes u and v so as to form a set U having all the unassigned links at 705. At 710 search the set U for the unassigned links with the highest/maximum queue size, i.e. the highest workload remaining after the first stage channel assignment, assuming that it is $L \in (u,v)$. It should be noted that the remaining queue size is the aggregated queue size in node u corresponding to all the links $L \in (u,v)$. These links share a queue. At 715 for the unassigned link L with the maximum remaining queue size, find all the pairing link candidates L' operating on channel i. A pairing link candidate L' must satisfy (a) L' is the only link that has been assigned on channel i among the neighboring links of link L in the first stage Let N(L,i) denote the set of links that have been assigned on channel i and interfere with link L on channel i. That is, the set of neighboring links of link L that have been assigned on channel i. $|N(L,i)|$ is the number of links in N(L,i). Then $|N(L,i)|=1$ and $L' \in N(L,i)$. And (b) no neighboring links of link L' has been assigned on channel i, i.e. paired with link L' in the second stage, i.e. $N(L',i)=\Phi$.

A test is performed at 720 to determine if any link pair candidates have been located/found. If any link pair candidates have been located then at 725 determine the throughput of links L and L' (the data rate that can transmit on L and L') in this time slot as well as the MIMO streams and mode used by links L and L' for transmission if L is assigned on channel i and transmit simultaneously with link L' with MIMO, i.e. if L and L' pair. An exemplary embodiment for this procedure is described below and depicted in FIG. 8. A test is performed at 730 to determine if more link pair candidates exist/have been located. If more/additional link pair candidates have been located then processing proceeds to 725. If there are no more link pair candidates then at 735 select a candidate to pair among the candidate links such that link L can have the maximum throughput if pairing with this candidate. Assume the candidate link L' is selected and L' operates on channel i, assign channel i on link L where L∈(u,v). That is, assign an unused radio on node u to operate on channel i (F(u)=F(u)∪{i}) and an unused radio on node v to operate on channel i (F(v)=F(v)∪{i}). Add (L,i) to $M^i(t)$ (add link L to the transmit schedule), meaning that in the t-th time slot link L can be active on channel i using the MIMO streams and mode determined in 725. Update $M^i(t)$ for link (L',i) with the new MIMO streams and mode determined in 725. Links L and L' operate based on the MIMO streams and mode determined in 725. After pairing, link L' may not transmit using all its MIMO streams as determined in the first stage because it will share the same channel with link L. The total number of MIMO parallel streams on link L and L' should not be greater than the degree of freedom, or the number of the antenna elements, K. Update the queue size of link L and L'. $q_L = q_L - \theta_L^i \delta$ and $q_{L'} = q_{L'} + r_{L'}^i \delta - \theta_{L'}^i \delta$ where $\theta_L^i$ and $\theta_{L'}^i$ are the throughput on link L and L' in time slot t, respectively, (determined in 725) and δ is the time slot length. Due to the channel sharing of MIMO links L and L', data cannot transmit at the full link capacity of link L or link L', i.e. either link cannot transmit at its full degree of freedom, i.e. transmitting different streams on each of its antenna elements. The actual transmission rate on links L and L' are $\theta_L^i$ and $\theta_{L'}^i$, respectively, not $r_L^i$ and $r_{L'}^i$. Recall in the first stage, the queue of link L' was updated with $r_{L'}^i$ transmission rate. It needs to be modified in this step. Remove link L from the unassigned link set U.

A test is performed at 740 to determine if all radios on the transmitting node of link L have been assigned. At 745 if |F(u)|≥N(u) (node u has used up all its radios, no radio interfaces are available on node u anymore—if all radios on the transmitting node of link L have been assigned), remove from U all the links e where e is any link incident on node u (e∈δ(u)). A test is performed at 750 to determine if all radios on the receiving node of link L have been assigned. If all radios on the transmitting node of link L have not been assigned then processing proceeds to 750. At 755 if |F(v)|≥N(v) (node v has used up all its radios, no radio interfaces are available on node v anymore—if all radios on the receiving node of link L have been assigned), remove from the set U all the link-channel pairs e' where e' is any link incident on node v (e'∈δ(v)). A test is performed at 760 to determine if set U is empty. If all radios on the receiving node of link L have not been assigned then processing proceeds to 760. If set U is empty, then processing ends. If set U is not empty, then processing proceeds to 710.

If no link pair was located for link L then at 765 the link L is inactive in this time slot, and remove the unassigned link L from the unassigned link set U. Processing then proceeds to 760.

As an exemplary embodiment for determining the throughput of links L and L' as well as the MIMO streams, and mode used by links L and L' for transmission if the links are paired and sharing channel i (above 725 of FIG. 7), the following procedure is performed.

1. Form a set F of link-stream pairs (l, k), where l∈{L,L'} and k∈{1, 2, . . . K} and define a stream set S that is initially empty, S=Φ.
2. Link L' was assigned in the first stage for transmitting with all its degrees of freedom, i.e. transmitting different streams on all its antenna elements with the total link data rate $r_{L'}^i$. Now it will share the channel with link L. Let $\pi_{L'}$ denote the queue size of link L' if link L' is not assigned in the first stage, $\pi_{L'} = q_{L'} + r_{L'}^i \delta$. Update the queue size. Let $\pi_L$ denote the current queue size of link L $\pi_L = q_L$. Let $\theta_l^i$ denote the throughput of link l (l∈{L,L'}) if links L and L' are paired. Initialize $\theta_l^i = 0$. Assign a weight for each link stream pair in set F.
3. Search in set F for the link-stream pair (l, k) with the maximum weight $q_l r_l^{(i,k)}$. Remove (l, k) from set F and add it to set S, meaning that l may transmit on channel i using the k-th stream in the t-th slot. Update the throughput of link l $\theta_l^i = \theta_l^i + r_l^{(i,k)}$, and the queue size $\pi_l = \pi_l - r_l^{(i,k)} \delta$ where δ is the time slot length and $r_l^{(i,k)}$ is the data rate when l may transmit on channel i using the k-th stream.
4. Remove from set F the link-stream pair (l', k') where l'∈{L,L'} and l'≠l and k' is the stream on l' with the lowest channel gain. Since l and l' interfere with each other, one degree of freedom on l' corresponding to the lowest-channel-gain stream is dedicated to suppress interference from the transmission (l,k).
5. Repeat step 3 until the number of elements in set S is greater than K, i.e |S|>K, or set F has become empty.

Figure 8:
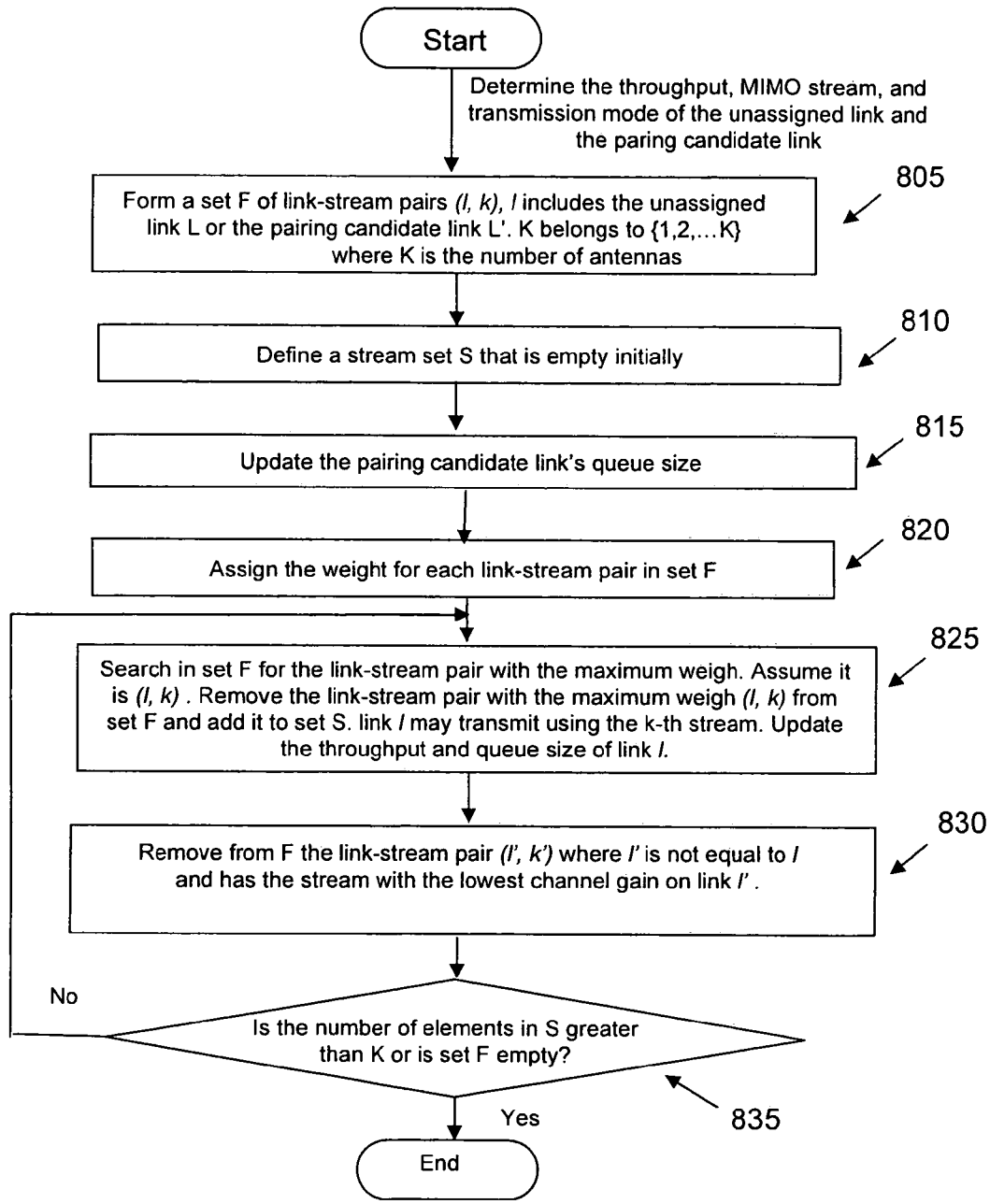
FIG. 8 is a flowchart for two links sharing a channel with MIMO in the two-stage channel assignment and stream control method in accordance with an exemplary embodiment of the present invention.

FIG. 8 is a flowchart of 725 from FIG. 7, which was described immediately above. FIG. 8 is for two links sharing a channel with MIMO (725 of FIG. 7—second stage) in the two-stage channel assignment and stream control method in accordance with an exemplary embodiment of the present invention. At 805 form a set F of link-stream pairs (l, k), where l∈{L,L'} and k∈{1, 2, . . . K} where K is the number of antennas. At 810 define a stream set S that is initially empty, S=Φ. At 815 link L' was assigned in the first stage for transmitting with all its degrees of freedom, i.e. transmitting different streams on all its antenna elements with the total link data rate $r_{L'}^i$. Now it will share the channel with link L. Let $\pi_{L'}$ denote the queue size of link L' if link L' is not assigned in the first stage, $\pi_{L'} = q_{L'} + r_{L'}^i \delta$. Update the pairing candidate link's queue size. Let $\pi_L$ denote the current queue size of link L $\pi_L = q_L$. Let $\theta_l^i$ denote the throughput of link l (l∈{L,L'}) if links L and L' are paired. Initialize $\theta_l^i = 0$. At 820 assign a weight for each link stream pair in set F. At 825 search in set F for the link-stream pair (l, k) with the maximum weight $q_l r_l^{(i,k)}$. Remove (l, k) from set F and add it to set S, meaning that l may transmit on channel i using the k-th stream in the t-th slot. Update the throughput of link l $\theta_l^i = \theta_l^i + r_l^{(i,k)}$, and the queue size $\pi_l = \pi_l - r_l^{(i,k)} \delta$ where δ is the time slot length and $r_l^{(i,k)}$ is the data rate when l may transmit on channel i using the k-th stream. At 830 remove from set F the link-stream pair (l', k') where l'∈{L,L'} and l'≠l and k' is the stream on l' with the lowest channel gain. Since l and l' interfere with each other, one degree of freedom on l' corresponding to the lowest-channel-gain stream is dedicated to suppress interference from the transmission (l,k). A test is performed at 835 to determine if the number of elements in set S is greater than K, i.e |S|>K, or set F is empty. If the number of elements in set S is greater than K, i.e |S|>K, or set F is empty then processing ends. If the number of elements in set S is less than or equal to K, i.e |S|≤K, and set F is not empty then processing proceeds to 825.

Figure 9A:
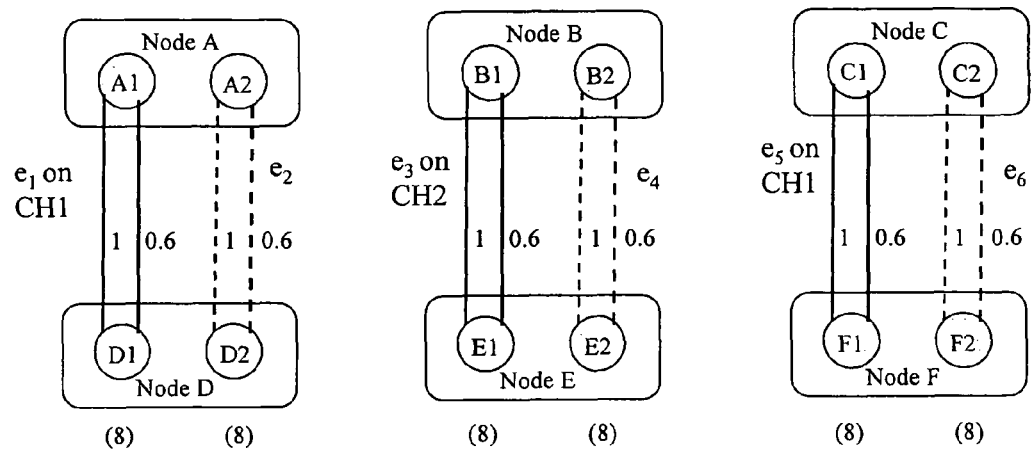
FIGS. 9(*a*) and 9(*b*) illustrate an example for stream control and link pairing in a wireless network with six nodes.

As an example, consider a wireless network with six nodes as shown in FIG. 9(a). Each of the six nodes A to F is equipped with two radios and each radio has two MIMO antenna elements. Six MIMO links exist—links $e_1$ and $e_2$ between A and D ($e_1, e_2 \in (A, D)$), links $e_3$ and $e_4$ between B and E ($e_3, e_4 \in (B,E)$), and $e_5$ and $e_6$ between C and F ($e_5, e_6 \in (C, F)$), respectively. Each of the links has two streams at maximum, shown as the two lines between the two corresponding radios. The numbers beside the lines in FIG. 9(a) are the channel gains for the respective streams, while those in the parentheses denote the aggregate rates of the corresponding links. The aggregate rate of a link is the transmission rate on that link when it uses all its streams to transmit. For example, link $e_l$ can transmit at 8 data-units per time-slot if it transmits two independent streams at a time. Links (A, D) and (B, E) interfere each other, and (B,E) and (C, F) also interfere, but (A,D) and (C,F) do not interfere each other. There are two available non-overlapping channels, CH1 and CH2.

Assuming link $e_1$ works on CH1, $e_3$ on CH 2, $e_5$ on CH1 according to channel assignment procedure (first stage in the above description (FIG. 6)) that are shown in solid lines in FIG. 9(a). Due to one unused radio on each node, there are three unassigned links $e_2 \in (A, D)$, $e_4 \in (B, E)$ and $e_6 \in (C, F)$ that are shown as dashed lines in FIG. 9(a).

Figure 9B:
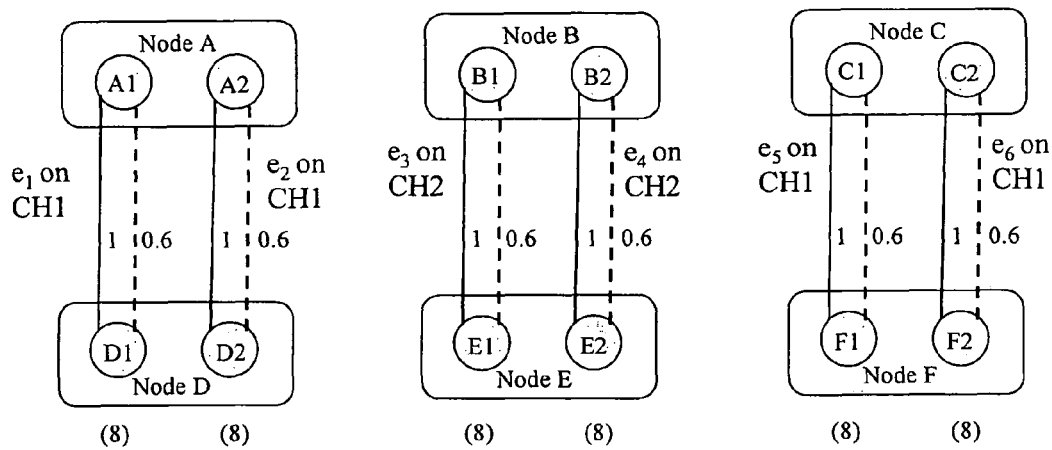

Assume links (B, E) have the largest workload (queue size), then stream control starts with link $e_4 \in (B, E)$. $e_4 \in (B, E)$ cannot be paired with link $e_1$ or link $e_5$ because both of link $e_1$ and link $e_5$ have been assigned to work on CH1 (condition in 3(a) is not satisfied). $e_3$ on CH 2 is a pairing candidate for $e_4$. If $e_4$ and $e_3$ are paired, the stream with channel gain 1 on $e_4$ and the stream with channel gain 1 on $e_3$ are selected. That is, the streams with the highest gain are selected. Links $e_3$ and $e_4$ are paired on CH2. Similarly links $e_2$ and $e_1$ are paired on CH1, and links $e_6$ and $e_5$ are paired on CH1 and the stream with channel gain 1 on each link is selected to be active, as shown in FIG. 9(b). The throughput for link $e_1$ is $$\theta_{e_1}^{CH1} = \frac{1}{1+0.6} \times 8 = 5.$$

Similarly, the throughput for links $e_2 \ldots e_6$ are $\theta_{e_2}^{CH1}=5$, $\theta_{e_3}^{CH2}=5$, $\theta_{e_4}^{CH2}=5$, $\theta_{e_5}^{CH1}=5$, $\theta_{e_6}^{CH1}=5$, respectively. The aggregate throughput between nodes A and D is 10, i.e. the total throughput of (A, D) is 10. Similarly, the total throughput of (B, E) is 10 and the total throughput of (C, F) is also 10. If there is no pairing, links $e_2$, $e_4$ and $e_6$ are not active and the throughput between nodes A and D (A, D) would be 8. Similarly, the total throughput of (B, E) would be 8 and throughput of (C, F) would also be 8.

Figure 10:
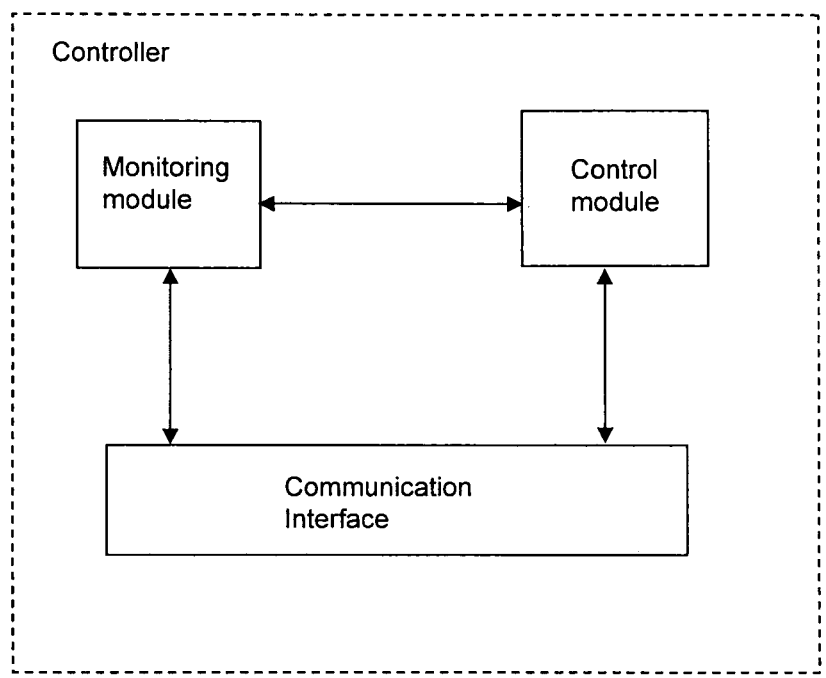
FIG. 10 is a block diagram of an exemplary implementation of the central controller of the present invention.

The methods in the present invention can be implemented in a central controller or implemented in a distributed manner. If the method is implemented in a central controller, the central controller can be hosted in the gateway, a mesh node or a separate node connected to the wireless mesh network. The separate node can be in the mesh network or in the wired network connected to the mesh network. Referring to FIG. 10, which is a block diagram of an exemplary implementation of the central controller of the present invention. The monitoring module collects the network state information from the mesh nodes through the communication module. The control module runs at least one embodiment of the present invention as a routine to determine the routing, channel assignment, stream control and transmission scheduling. The control module sends the instructions for the determined routing, channel assignment, stream control and scheduling to the mesh nodes via communication module.

Figure 11:
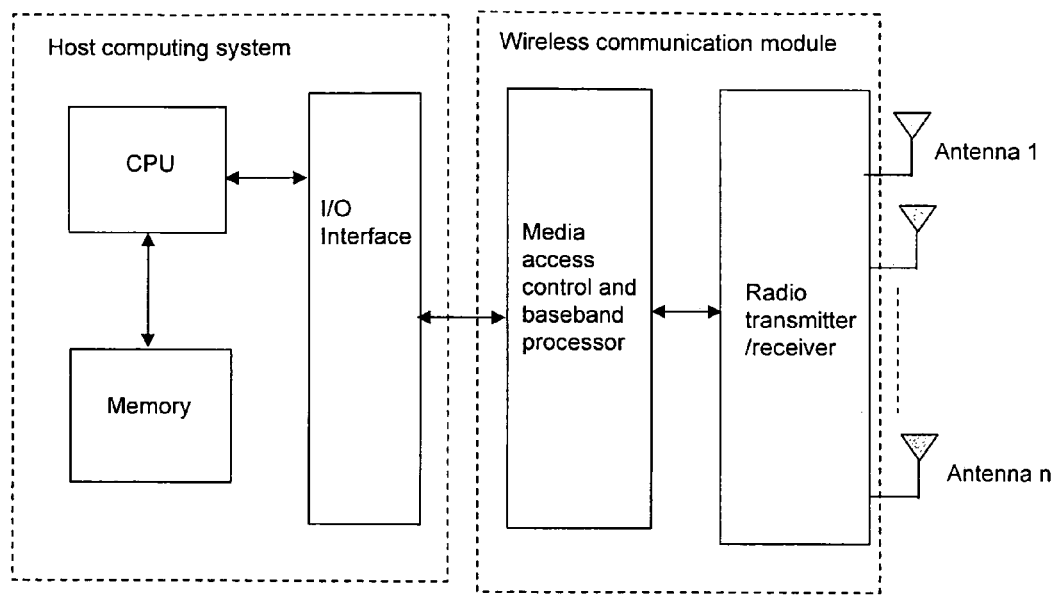
FIG. 11 is a block diagram of an exemplary implementation of the mesh access point/mesh router/mesh node in accordance with the present invention.

Referring to FIG. 11, which is a block diagram of an exemplary implementation of the mesh access point/mesh router/mesh node in accordance with the present invention. The mesh node includes a host computing system and one or more wireless communication modules. The host processing system can be a general-purpose computer or a specific-purpose computing system. The host computing system can include a central processing unit (CPU), a memory and an input/output (I/O) interface. The wireless communication module can include a media access control (MAC) and baseband processor, radio transmitter and/or receiver, and multiple MIMO antenna elements. The radio transmitter and/or receiver may be a radio transceiver or a separate radio transmitter and radio receiver. An antenna transmits and receives radio signals. The radio transmitter and/or receiver perform radio signal processing. The MAC and baseband processor performs MAC control and data framing, modulation/demodulation, coding/decoding for the transmission/receiving. The wireless communication module monitors and measures the wireless link, channel and network state information and reports the information to the central controller.

In an alternative embodiment, the present invention can be implemented distributively in the mesh nodes. At least one embodiment of the present invention can be implemented as a routine in the host computing system or in the wireless communication module of the mesh node to determine the routing, transmission scheduling, channel assignment and MIMO stream control.

In another embodiment, the present invention can be implemented in a combination of centralized and distributed manner. As an example, the routing may be determined by the central controller but the channel assignment, transmission scheduling, and steam control may be determined by the individual mesh nodes.

The block diagrams of FIGS. 10 and 11 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagrams thus fully enable the various methods/processes to be practiced in hardware, software, firmware, a field programmable gate array (FPGA), an application specific integrated circuit (ASIC), a reduced instruction set computer (RISC) or any combination thereof.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for determining a route, channel assignment, multiple-in, multiple out stream control and a transmission schedule in a network, said method comprising:
   determining said route responsive to long term network conditions and long term traffic conditions of the network;
   determining said channel assignment, said multiple-in multiple-out stream control, and said transmission schedule responsive to local channel conditions, local link conditions and local traffic conditions of the network;
   determining if there has been a change in one of said long term network conditions and said long term traffic conditions of the network;
   forming a first set of link-channel-stream triplets in a network;
   determining a weight for each link-channel-stream triplet;
   locating said link-channel-stream triplet having a maximum weight;
   scheduling said link-channel-steam triplet in a time slot;
   assigning a channel to transmitting and receiving radios of a link associated with said link-channel-stream triplet;
   updating a queue size of said link;
   removing said link-channel-stream triplet from said first set;
   removing all link-channel-stream triplets that are in an interference range of said link and use a same channel from said first set and where a stream has a lowest channel gain from said set;
   removing all link-channel-stream triplets that are incident on a transmitting node of said link and not communicating using channels assigned to said transmitting node from said first set; and
   removing all link-channel-stream triplets that are incident on a receiving node of said link and not communicating using channels assigned to said receiving node from said first set.

2. The method according to claim 1, further comprising:
   initializing a time slot pointer;
   determining if said first set is empty;
   incrementing said time slot pointer; and
   determining if said time slot pointer has reached a maximum value.

3. The method according to claim 1, wherein said network is a multi-hop wireless network.

4. A method for determining a route, channel assignment, multiple-in, multiple out stream control and a transmission schedule in a network, said method comprising:
   determining said route responsive to long term network conditions and long term traffic conditions of the network;
   determining said channel assignment, said multiple-in multiple-out stream control, and said transmission schedule responsive to local channel conditions, local link conditions and local traffic conditions of the network;
   determining if there has been a change in one of said long term network conditions and said long term traffic conditions of the network;
   forming a first set including all link-channel pairs in said network;
   determining a weight for each link-channel pair;
   locating said link-channel pair having a maximum weight;
   scheduling said link-channel pair in a time slot;
   assigning a channel to transmitting and receiving radios of a link associated with said link-channel pair;
   updating a queue size of said link;
   removing said link-channel pair from said first set;
   removing all link-channel pairs that are incident on a transmitting node of said link from said first set;
   removing all link-channel pairs that are incident on a receiving node of said link from said first set; and
   performing multiple-in multiple-out stream control and link pairing.

5. The method according to claim 4, further comprising: initializing a time slot pointer; determining if said set is empty; incrementing said time slot pointer; and
   determining if said time slot pointer has reached a maximum value.

6. The method according to claim 4, wherein said performing act further comprises:
   forming a second set including all unassigned link-channel pairs in said network;
   locating said unassigned link-channel pair with a maximum remaining queue size;
   locating all link-channel pairing candidates for said unassigned link with said maximum remaining queue size;
   determining a throughput, said multiple-in multiple-out stream control and a transmission mode between said unassigned link with said maximum remaining queue size and each of said link-channel pairing candidates;
   selecting said candidate link-channel pair such that said unassigned link has a maximum throughput if paired with said link-channel pair;
   assigning said channel to said transmitting radio and said receiving radio of said unassigned link;
   scheduling said unassigned link in a time slot;
   assigning said multiple-in multiple out stream control to said unassigned link and said selected candidate link-channel pair;
   assigning said transmission mode to said unassigned link and said selected candidate link-channel pair;
   updating said queue size of said unassigned link and said selected candidate link-channel pair;
   removing said unassigned link from said second set;
   removing all unassigned links that are incident on a transmitting node of said link from said second set; and
   removing all unassigned links that are incident on a receiving node of said link from said second set.

7. The method according to claim 6, further comprising removing said unassigned link from said second set if no candidate link-channel pair can be located.

8. The method according to claim 6, wherein said determining act further comprises: forming a third set including said unassigned links and said candidate link-channel pairs; defining and initializing a fourth set; updating a queue of said candidate link-channel pair; assigning a weight for each link-stream pair in said third set; locating said link-stream pair having a maximum weight; removing said link-stream pair having said maximum weight from said third set; adding said link-stream pair having said maximum weight to said fourth set; updating said queue size and said throughput of said unassigned link; removing said link-stream pair having a lowest channel gain from said third set, wherein said link-stream pair is not said unassigned link.

* * * * *